US008891762B2

(12) United States Patent
Rane et al.

(10) Patent No.: US 8,891,762 B2
(45) Date of Patent: Nov. 18, 2014

(54) METHOD FOR PRIVACY-PRESERVING ORDER SELECTION OF ENCRYPTED ELEMENT

(75) Inventors: Shantanu Rane, Cambridge, MA (US); Wei Sun, Kitchener (CA)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 1013 days.

(21) Appl. No.: 12/965,066

(22) Filed: Dec. 10, 2010

(65) Prior Publication Data

US 2014/0105385 A1 Apr. 17, 2014

(51) Int. Cl.
*H04L 29/06* (2006.01)
*H04L 9/08* (2006.01)

(52) U.S. Cl.
CPC .................................. *H04L 9/0819* (2013.01)
USPC ................. 380/30; 380/28; 380/44; 380/278; 713/167

(58) Field of Classification Search
CPC ....................................................... H04L 9/30
USPC ..................................................... 726/28, 30
See application file for complete search history.

(56) References Cited

U.S. PATENT DOCUMENTS

| 8,689,087 | B2* | 4/2014 | Seurin et al. ................... 714/777 |
| 2007/0189515 | A1* | 8/2007 | Ajtai ............................... 380/30 |
| 2011/0060917 | A1* | 3/2011 | Troncoso Pastoriza et al. ............................. 713/189 |
| 2011/0091033 | A1* | 4/2011 | Michiels et al. ................ 380/28 |
| 2011/0200185 | A1* | 8/2011 | Ghouti et al. ................... 380/28 |
| 2011/0202764 | A1* | 8/2011 | Furukawa ..................... 713/167 |

OTHER PUBLICATIONS

"Low-Reiter: Niederreiter Encryption Scheme for Embedded Microcontrollers"; by Stefan Heyse;Ruhr University Bochum, Germany; Springer-Verlag Berlin Heidelberg 2010; 17 pages.*
"Hierarchical identity based encryption with constant size ciphertext"; Boneh et al; Advances in Cryptology—EUROCRYPT 2005, 29 pages.*

* cited by examiner

*Primary Examiner* — Jason Lee
(74) *Attorney, Agent, or Firm* — Dirk Brinkman; Gene Vinokur

(57) ABSTRACT

A system and a method select an encrypted element in an encrypted vector according to an order of the encrypted element in the encrypted vector. The selecting is performed in a privacy-preserving manner. Values of the elements of the encrypted vector are scaled, such that the order of the elements in the encrypted vector is preserved, and then permuted to produce a scaled permuted vector. Information in the encrypted domain indicative of an order of elements in the scaled permuted vector is provided to a second processor having a private key. The second processor decrypts the information to determine the index of the encrypted element based on the order of the elements. The encrypted element is obliviously selected based on the index.

8 Claims, 4 Drawing Sheets

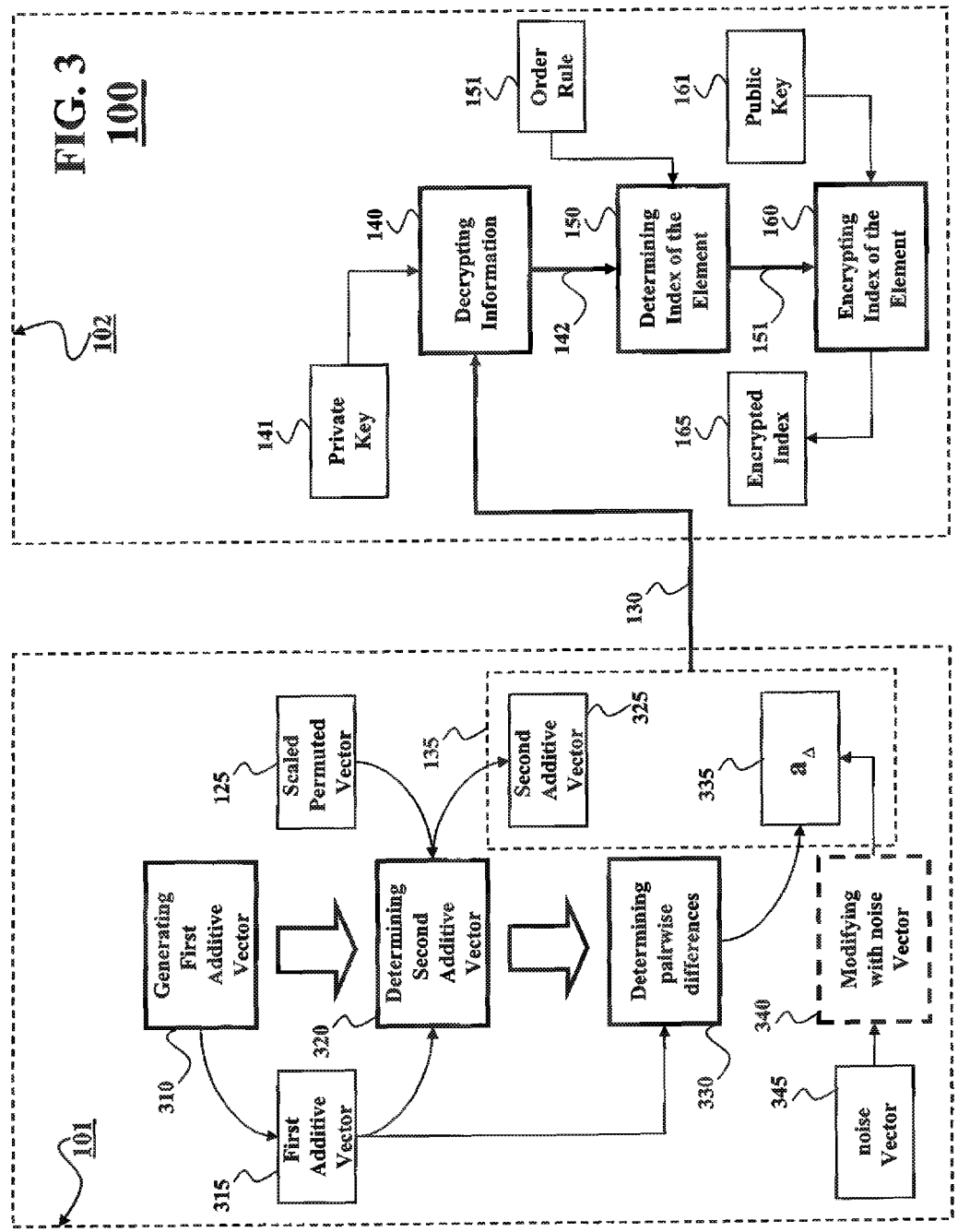

1. scaling the values of the elements of the encrypted vector;

2. permuting the order of the elements to produce scaled permuted vector;

3. partitioning the scaled permuted vector into first and second additive vector;

4. determining a vector of pairwise differences of elements of the first additive vector;

5. providing the vector of pairwise differences and the second additive vector;

6. obtaining an encrypted index of the encrypted element in the scaled permuted vector;

7. providing to the second processor the encrypted vector modified by a first perturbation term and a second perturbation function of the indices whose value equals zero at the encrypted index;

8. obtaining an encrypted modified element corresponding to the encrypted index;

9. subtracting the first perturbation term in the encrypted domain to produce the encryption of the element corresponding to the encrypted index.

FIG. 4

1
METHOD FOR PRIVACY-PRESERVING ORDER SELECTION OF ENCRYPTED ELEMENT

FIELD OF THE INVENTION

This invention relates generally to a secure multiparty computation method, and more particularly for determining an encrypted element in an encrypted vector according to an order of the encrypted element in the encrypted vector.

BACKGROUND OF THE INVENTION

For a number of applications, a problem of determining the minimum or the maximum, of a finitely long sequence of elements in a privacy preserving manner is important. For example, the elements are sensitive biometric, medical, scientific, technical, financial, or commercial data.

The problem is defined as follows. A first processor stores a sequence of encrypted elements. The first processor interacts with a second processor to determine the encryption of, e.g., the minimum element, in the sequence. The requirement of the problem is that the value and the index of the minimum element are not discovered by any processor.

This particular problem arises in many secure multiparty computation methods. For example, the first processor has a database of binary fingerprint feature vectors and the second processor has a single encrypted fingerprint feature vector. Then, the first processor, using a secure multiparty computation method, determines encrypted Hamming distances between the single feature vector of the second processor and each feature vector in the database. Thus, the first processor obtains a vector of encrypted Hamming distances. Next, the encryption of the minimum Hamming distance is determined to locate the fingerprint feature vector in the database most similar to the first feature vector.

Accordingly, there is a need for selecting an encrypted element in an encrypted vector according to an ordering of the encrypted elements in the encrypted vector.

SUMMARY OF THE INVENTION

It is an object of present invention to provide a system and a method for selecting an encrypted element in an encrypted vector according to an order of the encrypted element in the encrypted vector. The order of the encrypted element in the encrypted vector is determined by an order of values of elements of the encrypted vector decrypted with the private key. For example, some embodiments of the invention select a minimum element from the encrypted vector in a privacy-preserving manner. Similarly, some embodiments selected a maximum element, or the element having a predetermined order in the encrypted vector.

The embodiments select the encrypted element using a secure multiparty communication between a first processor and a second processor. The second processor has a pair of keys for a semantically secure additively homomorphic cryptosystem, the pair includes a private key and a public key. The second processor operates mostly in unencrypted domain. Conversely, the first processor stores only the public key, and operates only in encrypted domain. The encrypted vector is encrypted with the public key and stored at the first processor.

The embodiments of the invention are based on two realizations. First, the first processor can apply an order-preserving mapping to a sequence of elements and send the result to the second processor, which can determine an index of the element based on the order of elements without knowing the elements. Second, the order-preserving mapping can be applied in the encrypted domain, thereby keeping the entire sequence of elements secret from both the first processor and the second processor.

Accordingly, the embodiments of the invention scale the values of the encrypted vector in the encrypted domain such that the order of the elements in the encrypted vector is preserved. The order-preserving scaling combined with a permutation of the order produces a scaled permuted vector. Hence, information about the scaled permuted vector can be provided to the second processor that stores the private key, while the information in an unencrypted domain is indicative of the order of the elements in the scaled and permuted vector. Such transmission is possible, because the real values and the real order of the encrypted vector are hidden by the scaling and the permutation.

Accordingly, one embodiment of the invention discloses a method for selecting an encrypted element in an encrypted vector according to an order of the encrypted element in the encrypted vector using secure multiparty communication between a first processor and a second processor, wherein the second processor stores a pair of keys for a semantically secure additively homomorphic cryptosystem, the pair includes a private decryption key and a public encryption key, wherein the encrypted vector is encrypted with the public key and stored at the first processor, and wherein the first processor stores only the public key, such that the first processors operates only in the encrypted domain, comprising the steps of: scaling the values of the elements of the encrypted vector, such that the order of the elements in the encrypted vector is preserved; permuting the order of the elements of the encrypted vector to produce scaled and permuted vector; providing information in the encrypted domain to the second processor, wherein the information in an unencrypted domain is indicative of an order of elements in the scaled and permuted vector; obtaining an encrypted index of the encrypted element in the scaled and permuted vector; and selecting the encrypted element based on the encrypted index, wherein the steps of the method are performed by the first processor.

Another embodiment discloses a system for selecting an encrypted element in an encrypted vector according to an order of the encrypted element in the encrypted vector using a secure multiparty communication between a first processor of the system and a second processor, wherein the second processor stores a pair of keys for a semantically secure additively homomorphic cryptosystem, the pair includes a private decryption key and a public encryption key, wherein the encrypted vector is encrypted with the public key and stored at the first processor, and wherein the first processor operates only in an encrypted domain, the system comprising: means for scaling values of the elements of the encrypted vector, such that the order of the elements in the encrypted vector is preserved; means for permuting the order of the elements of the encrypted vector to produce a scaled permuted vector; means for providing information in the encrypted domain to the second processor, wherein the information in an unencrypted domain is indicative of an order of elements in the scaled permuted vector; means for obtaining an encrypted index of the encrypted element in the scaled permuted vector; and means for selecting the encrypted element based on the encrypted index, wherein the steps of the method are performed by the first processor.

Yet another embodiment discloses a method for selecting an encrypted element in an encrypted vector according to an order of the encrypted element in the encrypted vector using a secure multiparty communication between a first processor and a second processor, wherein the second processor stores a pair of keys for a semantically secure additively homomorphic cryptosystem, the pair includes a private encryption key and a public decryption key, wherein the encrypted vector is encrypted with the public key and stored at the first processor, and wherein the first processor operates only in an encrypted domain, comprising the steps of: scaling values of the elements of the encrypted vector, such that the order of the elements in the encrypted vector is preserved; permuting the order of the elements of the encrypted vector to produce a scaled permuted vector; partitioning the scaled permuted vector into a first additive vector and a second additive vector; determining a vector of pairwise differences of elements of the first additive vector; providing the vector of pairwise differences and the second additive vector to the second processor for determining the encrypted index; obtaining an encrypted index of the encrypted element in the scaled permuted vector; providing to the second processor the encrypted vector modified by a first perturbation term and a second perturbation function of the indices, wherein a value of the second perturbation function at the encrypted index equals zero; obtaining from the second processor an element of the encrypted vector corresponding to the encrypted index; and subtracting the first perturbation term in the encrypted domain to obtain the encrypted element of the encrypted vector, wherein the steps of the method are performed by the first processor.

Definitions

In describing embodiments of the invention, the following definitions are applicable throughout (including above).

A "computer" refers to any apparatus that is capable of accepting a structured input, processing the structured input according to prescribed rules, and producing results of the processing as output. Examples of a computer include a computer; a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "central processing unit (CPU)" or a "processor" refers to a computer or a component of a computer that reads and executes software instructions.

A "memory" or a "computer-readable medium" refers to any storage for storing data accessible by a computer. Examples include a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network, and a computer memory, e.g., random-access memory (RAM).

"Software" refers to prescribed rules to operate a computer. Examples of software include software; code segments; instructions; computer programs; and programmed logic. Software of intelligent systems may be capable of self-learning.

A "module" or a "unit" refers to a basic component in a computer that performs a task or part of a task. It can be implemented by either software or hardware.

BRIEF DESCRIPTION OF THE DRAWINGS

FIG. 3 is a block diagram of a method for securely determining information indicative of an order of the elements according to an embodiment of the invention; and FIG. 4 is a pseudo code of an embodiment of the invention.

DETAILED DESCRIPTION OF THE PREFERRED EMBODIMENT

Figure 1:
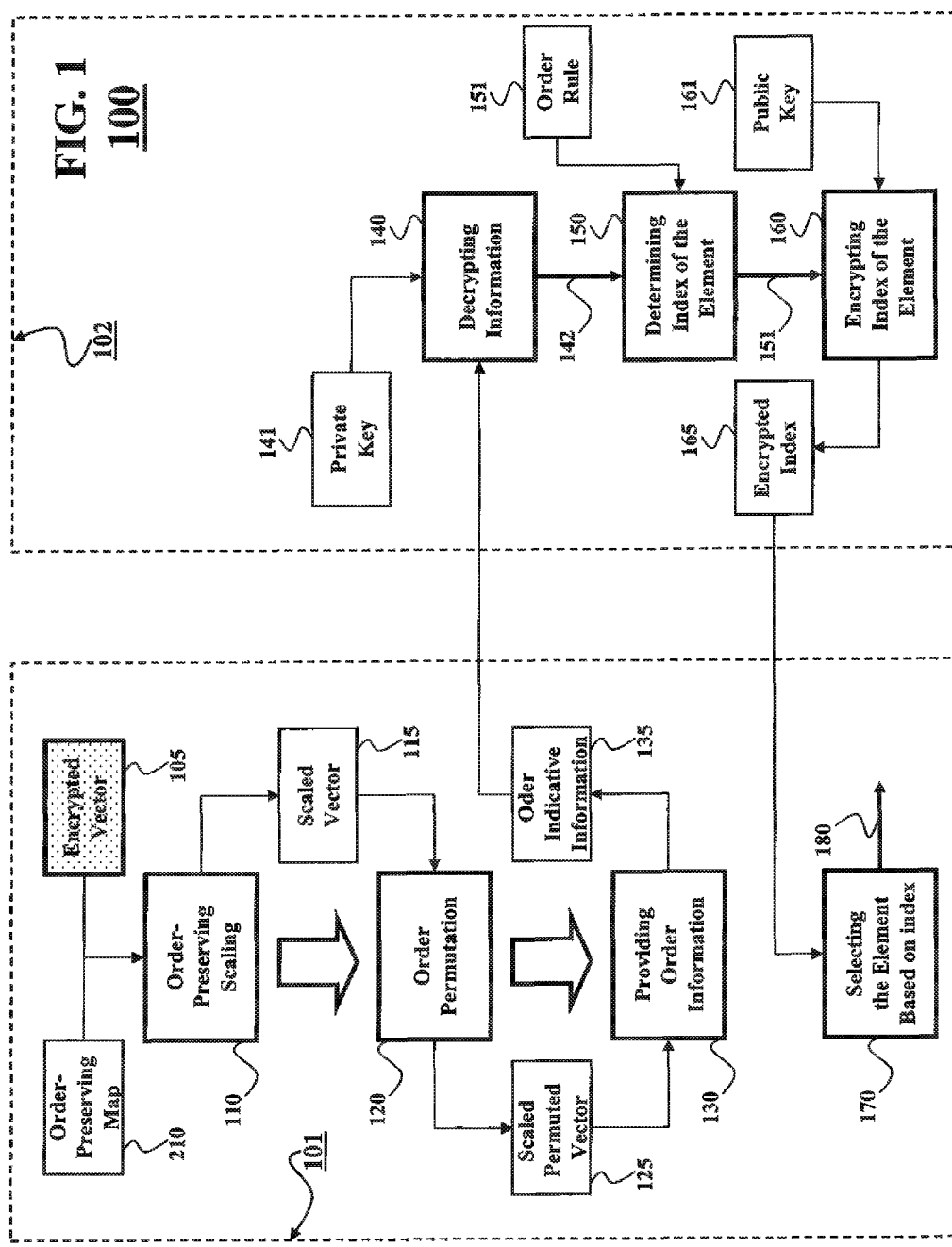
FIG. 1 is a block diagram of a method for selecting an encrypted element in an encrypted vector according to an embodiment of the invention.

FIG. 1 shows a method 100 for selecting an encrypted element 180 in an encrypted vector according to an order of the encrypted element in the encrypted vector 105 using a secure multiparty communication between a first processor 101 and a second processor 102.

The order of the encrypted element in the encrypted vector is determined by an order of values of the elements in the encrypted vector decrypted with a private key. The encrypted element is selected according to an order rule 151. Examples of the order rule include selecting a minimum element, selecting a maximum element, selecting a second minimum element in the encrypted vector, or selecting a median element. In various embodiments either the second processor or both processors know the order rule.

The second processor has a pair of keys for a semantically secure additively homomorphic cryptosystem. The pair includes a private decryption key 141 and a public encryption key 161. The second processor operates mostly in unencrypted domain. Conversely, the first processor operates only in encrypted domain. The encrypted vector 105 is encrypted with the public key and stored at the first processor.

For example, the key pair $(k_e, k_d)$ is the encryption/decryption key pair for a semantically secure additively homomorphic public key cryptosystem. An encryption function is $\xi(\bullet)$, and a decryption function is $\xi^{-1}(\bullet)$, respectively. The additively homomorphic property ensures that $\xi(m_1)\xi(m_2)=\xi(m_1+m_2)$ and $\xi(m_1)^{m_2}=\xi(m_1 m_2)$ for vectors of elements $m_1$, $m_2$. Further, for a vector of elements $\mathbf{z} \in Z^N$, the encrypted vector 105 is $\xi(\mathbf{z})=(\xi(z_1), \xi(z_2), \ldots, \xi(z_N))$.

Accordingly, the first processor has the public encryption key $k_e$ and the encrypted vector $\xi(\mathbf{z})$, the second processor has the key-pair $(k_e, k_d)$. After performing the method 100, the first processor obtains $\xi(\min_{1 \leq i \leq N} z_i)$. The second processor obtains nothing.

The embodiments of the invention scale 110 the values of the elements in the encrypted vector in the encrypted domain to produce a scaled vector 115. After the scaling, the order of the elements in the encrypted vector is preserved, e.g., an index of the minimum element in the encrypted vector equals an index of the minimum element in the scaled vector. The scaling is performed using an order-preserving matrix 210 as described in greater details below.

Next, the order of elements in the scaled vector is permuted 120 to produce a scaled permuted vector 125, and information 135 in the encrypted domain is provided 130 to the second processor, wherein the information in an unencrypted domain is indicative of an order of elements in the scaled permuted vector. In one embodiment, the information is the scaled and permuted vector itself.

Another embodiment partitions the scaled permuted vector into a first additive vector and a second additive vector, and the information is a vector of pairwise differences of elements of the first additive vector and the second additive vector.

The second processor decrypts 140 the information using the private key, and determines 150, from the information 142 in the unencrypted domain, an index 151 of the element according to the order rule 151. Next, the second processor encrypts 160 the index with the public key, and provides the encrypted index 165 to the first processor.

The first processor selects 170 the encrypted element 180 based on the encrypted index 165. In various embodiments, the selection of the encrypted element based on the encrypted index of the element is based on the oblivious communication between the first and the second processor, as described below.

Order-Preserving Scaling

The objective of the order-preserving scaling is to modify the values of the encrypted vector while preserving the order of the elements of the vector. Embodiments of the invention are based on the realization that the order-preserving mapping can be applied in the encrypted domain, thereby keeping the entire sequence of elements secret from both the first and the second processor.

Figure 2:
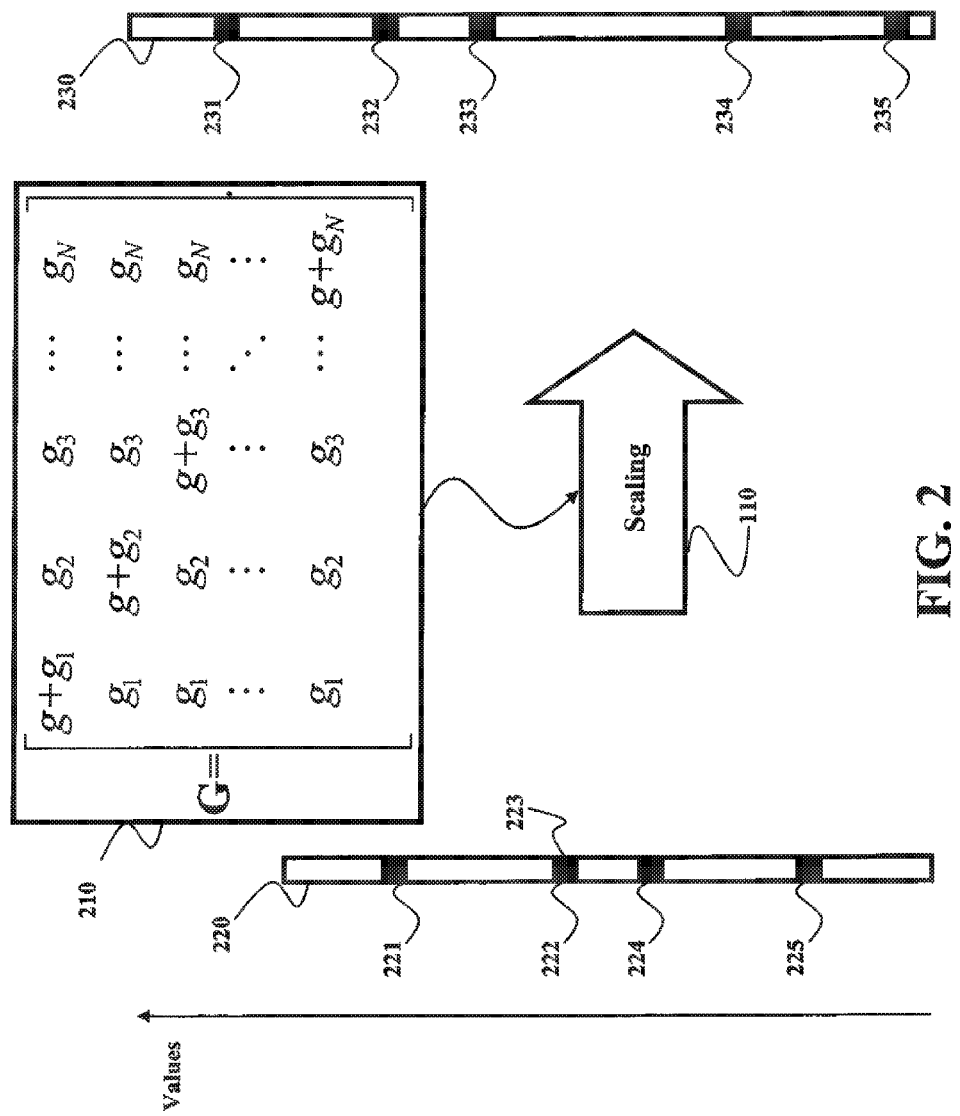
FIG. 2 is a schematic of an order preserving scaling according to an embodiment of the invention.

FIG. 2 shows a schematic of the order preserving scaling. For example, a vector 220 has five elements 221-225. The elements 222 and 223 have equal values. Multiplication of the vector 220 with the order preserving matrix 210 produces a scaled vector 230 having five elements 231-235 with different values, but with the same order of elements. For example, if the element 224 with an index one is the minimum element in the vector 220, the element 234 with the same index one is the minimum element in the scaled vector 230.

The scaling does not guarantee that the elements with the same values in the vector 220, e.g., the elements 222-223, have the same values in the scaled vector 230. However, the different values of the elements 232-233 do not disturb the order of the elements in the scaled vector 230.

Accordingly, in one embodiment, the first processor generates a permutation $\pi$ on the set $\{1,2,\ldots,N\}$, wherein N is a size of the encrypted vector, and obtains a permuted vector $\xi(v)=\pi(\xi(z))$. Then, the first processor selects an integer $g>0$ and generates the order preserving matrix $G \in Z^{N \times N}$ 210 according to $$G = \begin{bmatrix} g+g_1 & g_2 & g_3 & \cdots & g_N \\ g_1 & g+g_2 & g_3 & \cdots & g_N \\ g_1 & g_2 & g+g_3 & \cdots & g_N \\ \vdots & \vdots & \vdots & \ddots & \vdots \\ g_1 & g_2 & g_3 & \cdots & g+g_N \end{bmatrix}. \quad (3)$$

In one embodiment, the scaling is achieved by multiplying the encrypted vector by the order preserving matrix. For example, the scaled permuted vector is $w=Gv$. In the order preserving matrix, elements $g_i$ are integers.

For any $1 \leq i, j \leq N$, $w_i - w_j = g(v_i - v_j)$, which means that for $g>0$ G is an order-preserving matrix, i.e., $v_i \leq v_j$ if and only if, $w_i \leq w_j$. Using the properties of additive homomorphic encryption, the first processor determines $\xi(w) = \xi(Gv)$.

Order Indicative Information

The information about the scaled permuted vector is provided, e.g., transmitted, to the second processor that stores the private key, while the information in the underlying unencrypted domain is indicative of the order of elements in the scaled permuted vector, and, obliviously, about the order of the elements in the encrypted vector due to the construction of the order-preserving matrix. Such transmission is possible, because the real values and the real order of the encrypted vector are hidden by the scaling and the permuting.

In one embodiment, shown in FIG. 3, the scaled permuted vector is partitioned into a first additive vector and a second additive vector, and the information is formed by a vector of pairwise differences of elements of the first additive vector and the second additive vector itself.

Specifically, the first processor generates 310 the first additive vector 315 $a \in Z^N$ of random numbers. Using homomorphic properties, the first processor determines 320 the second additive vector 325 $\xi(w-a)$.

Next, the first processor constructs a vector of pairwise differences 335 $a_\Delta$. The elements of the vector 335 are the pairwise differences of the elements of first additive vector a. Thus, $a_\Delta=(a_1-a_2, a_1-a_3, \ldots; a_1-a_N, a_2-a_3, a_2-a_4, \ldots; a_2-a_N, \ldots; a_{N-1}-a_N)$.

The vector of pairwise differences 335 and the second additive vector 325 form the information 135 indicative of the order of elements in the scaled permuted vector. The information 135 is provided 130 to the second processor.

In one variation of this embodiment, values of the vector of pairwise differences are modified 340 with a noise vector 345. For example, the first processor generates random noise $\eta$ over the interval $[-g, g]$, and determines the noise vector $$\eta = (\eta_{ij})_{1 \leq i < j \leq N} \in Z^{\binom{N}{2}}$$

such that $-g \leq \eta_{ij} \leq g$ and $\Sigma_{1 \leq i < j \leq N} \eta_{ij} = \eta$. The vector of pairwise differences is modified with the noise vector according to $a_\Delta - \eta$ and is transmitted to the second processor.

The second processor obtains the second additive share in encrypted domain and obtains $b=w-a$ by element-wise decryption. The first processor has the first additive vector a and the second processor has the second additive vector b, which are additive shares of the scaled permuted vector w. Therefore $w_i \leq w_j$ if and only if $a_i + b_i \leq a_j + b_j$ if and only if $a_i - a_j \leq b_j - b_i$.

Next, the second processor determines a vector of pairwise differences of the second additive share, according to $b_\Delta = (b_1 - b_2, b_1 - b_3, \ldots, b_1 - b_N, b_2 - b_3, b_2 - b_4, \ldots, b_2 - b_N, \ldots, b_{N-1} - b_N)$. Both vectors of pairwise differences $a_\Delta$ and $b_\Delta$ contain $$\binom{N}{2}$$

elements.

The second processor compares the corresponding elements of $a_\Delta - \eta$ and $-b_\Delta$. For, any element $\eta_{ij}$ in the noise vector $\eta$, the second processor determines for $1 \leq i < j \leq N$ whether or not $a_i - a_j - \eta_{ij} \leq b_j - b_i$, which is equivalent to determining whether or not $g(v_i - v_j) - \eta_{ij} \leq 0$ by the construction of the matrix G matrix.

Because $-g \leq \eta_{ij} \leq g$, the second processor determines that $a_i - a_j - \eta_{ij} \leq b_j - b_i$ if and only if $v_i \gtrless v_j$, where an operator $\gtrless$ means "greater than" or "less than," as the case may be. Thus, the order is preserved when $v_i \neq v_j$. If $v_i = v_j$, then $a_i - a_j - \eta_{ij}$ can be greater or less than $b_j - b_i$ depending on the value of the element of the noise vector $\eta_{ij}$ selected by the first processor. Nevertheless, this perturbation still allows the second processor to determine the index 151, e.g., $\alpha = \arg\min_{1 \leq i \leq N} v_i$ without knowing elements of the scaled e.g., permuted vector. The encrypted index 165 is provided to the first processor.

Selecting Based on the Encrypted Index of the Element

In various embodiments, the selection of the encrypted element based on the encrypted index of the element uses an oblivious communication between the first and the second processor. For example, in one embodiment, the first processor randomly selects, for $1 \leq i \leq N$, numbers r and $\beta_i$, and uses homomorphic properties to determine $\xi(\beta_i(i-\alpha)+v_i+r)$, wherein r is a first perturbation term, and $\beta_i(i-\alpha)$ is a second perturbation function of the indices whose value equals zero at the encrypted index. The first processor provides the resulting vector of N encrypted entries to the second processor.

The second processor decrypts the entry corresponding to the index $i=\alpha$ to obtain a modified element $v_\alpha+r$. The second processor re-encrypts and provides the modified element to the first processor.

The first processor uses the additive homomorphic property to remove the noise introduced by the first perturbation term r via $$\xi(v_\alpha+r)\xi(-r)=\xi(v_\alpha)=\xi(\min_{1\leq i\leq N}v_i)=\xi(\min_{1\leq i\leq N}z_i)$$

to produce the encrypted element 180.

FIG. 4 shows a pseudo code of this embodiment, which is self explanatory.

Effect of the Invention

Conventional methods determine an element of a vector in a privacy preserving manner using variations of a secure millionaire protocol. For example, those methods perform repeated application of the secure millionaire protocol to determine the minimum element of the vector. However, those methods are computationally inefficient, because the communication overhead at both processors is proportional to $N^2$.

The embodiments of the invention avoid pairwise comparison of the elements of the vector by using an order-preserving scaling. The mapping enables a determination of an index of the element of interest in an unencrypted domain.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for selecting an encrypted element in an encrypted vector according to an order of the encrypted element in the encrypted vector using a secure communication between a first processor and a second processor, wherein the second processor stores a pair of keys for a semantically secure additively homomorphic cryptosystem, the pair includes a private decryption key and a public encryption key, wherein the encrypted vector is encrypted with the public key and stored at the first processor, and wherein the first processor operates only in an encrypted domain, comprising the steps of:

scaling values of the elements of the encrypted vector, such that the order of the elements in the encrypted vector is preserved, wherein the scaling further comprises:
   constructing an order preserving matrix; and
   multiplying the encrypted vector by the order preserving matrix;
permuting the order of the elements of the encrypted vector to produce a scaled permuted vector;
providing information in the encrypted domain to the second processor, wherein the information in an underlying unencrypted domain is indicative of an order of elements in the scaled permuted vector;
obtaining an encrypted index of the encrypted element in the scaled permuted vector; and
selecting the encrypted element based on the encrypted index;
selecting an integer $g>0$; and
determining the order preserving matrix $G \in Z^{N \times N}$ according to $$G = \begin{bmatrix} g+g_1 & g_2 & g_3 & \cdots & g_N \\ g_1 & g+g_2 & g_3 & \cdots & g_N \\ g_1 & g_2 & g+g_3 & \cdots & g_N \\ \vdots & \vdots & \vdots & \ddots & \vdots \\ g_1 & g_2 & g_3 & \cdots & g+g_N \end{bmatrix},$$

wherein Z is the set of integers and N is the number of elements in the encrypted vector, and elements $g_i$ are integers, wherein the steps of the method are performed by the first processor.

2. The method of claim 1, wherein the order of the encrypted element in the encrypted vector is determined by an order of the values of elements of the encrypted vector decrypted by the second processor with the private key.

3. The method of claim 1, wherein the encrypted index is determined in the unencrypted domain by the second processor according to the order of the elements in the scaled permuted vector and encrypted with the public key.

4. The method of claim 1, wherein the providing further comprising:
   partitioning the scaled permuted vector into a first additive vector and a second additive vector;
   determining a vector of pairwise differences of elements of the first additive vector;
   providing, the vector of pairwise differences and the second additive vector to the second processor for determining the encrypted index.

5. The method of claim 1, wherein the providing further comprising;
   providing the scaled permuted vector to the second processor for determining the encrypted index.

6. The method of claim 1, wherein the selecting further comprising:
   providing to the second processor the encrypted vector modified by a first perturbation term and a second perturbation function of the indices, wherein a value of the second perturbation function at the encrypted index equals zero;
   obtaining from the second processor an element of the encrypted vector corresponding to the encrypted index; and
   subtracting the first perturbation term in the encrypted domain, to obtain the encryption element of the encrypted vector.

7. The method of claim 1, wherein the encrypted index is determined based on an order rule.

8. The method of claim 7, wherein the order rule is selecting a minimum or a maximum element, such that the encrypted element is, respectively, a minimum element in the encrypted vector or a maximum element in the encrypted vector.

* * * * *